United States Patent
Wolf et al.

(10) Patent No.: US 10,207,425 B2
(45) Date of Patent: *Feb. 19, 2019

(54) METHOD FOR PRODUCING SEMIFINISHED PLASTICIZED PVC PRODUCTS

(71) Applicant: SIKA TECHNOLOGY AG, Baar (CH)

(72) Inventors: Ulrich Wolf, Laax (CH); Fabian Frei, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 223 days.

This patent is subject to a terminal disclaimer.

(21) Appl. No.: 15/117,567

(22) PCT Filed: Feb. 10, 2015

(86) PCT No.: PCT/EP2015/052697
§ 371 (c)(1),
(2) Date: Aug. 9, 2016

(87) PCT Pub. No.: WO2015/121221
PCT Pub. Date: Aug. 20, 2015

(65) Prior Publication Data
US 2016/0368167 A1     Dec. 22, 2016

(30) Foreign Application Priority Data
Feb. 13, 2014   (EP) .................................. 14155078

(51) Int. Cl.
| | | |
|---|---|---|
| *B29B 9/12* | (2006.01) | |
| *B29B 7/46* | (2006.01) | |
| *B29B 7/94* | (2006.01) | |
| *B29B 9/06* | (2006.01) | |
| *C08J 3/18* | (2006.01) | |
| *B29B 9/10* | (2006.01) | |
| *C08K 5/00* | (2006.01) | |
| *C08K 3/013* | (2018.01) | |
| *C08K 3/014* | (2018.01) | |
| *B29B 7/40* | (2006.01) | |
| *B29B 7/84* | (2006.01) | |
| *B29K 27/06* | (2006.01) | |
| *B29C 47/40* | (2006.01) | |
| *B29C 47/00* | (2006.01) | |
| *B29C 47/42* | (2006.01) | |
| *B29K 105/00* | (2006.01) | |

(52) U.S. Cl.
CPC ................. *B29B 9/12* (2013.01); *B29B 7/46* (2013.01); *B29B 7/94* (2013.01); *B29B 9/06* (2013.01); *B29B 9/10* (2013.01); *C08J 3/18* (2013.01); *C08K 3/013* (2018.01); *C08K 3/014* (2018.01); *C08K 5/0016* (2013.01); *B29B 7/40* (2013.01); *B29B 7/845* (2013.01); *B29B 9/065* (2013.01); *B29C 47/0004* (2013.01); *B29C 47/0009* (2013.01); *B29C 47/402* (2013.01); *B29C 47/408* (2013.01); *B29C 47/42* (2013.01); *B29C 2947/92047* (2013.01); *B29K 2027/06* (2013.01); *B29K 2105/0038* (2013.01); *B29K 2105/0044* (2013.01); *C08J 2327/06* (2013.01)

(58) Field of Classification Search
None
See application file for complete search history.

(56) References Cited

U.S. PATENT DOCUMENTS

| | | | | |
|---|---|---|---|---|
| 3,854,702 A | * | 12/1974 | Papenmeier ............ | B29B 7/005 366/144 |
| 4,767,216 A | | 8/1988 | Gwinn et al. | |
| 5,437,826 A | * | 8/1995 | Martinello .......... | B29C 47/1063 264/102 |
| 6,350,400 B1 | * | 2/2002 | Piotrowski ................. | C08J 3/18 264/211 |
| 6,565,784 B1 | * | 5/2003 | Esseghir ................ | B29B 7/007 264/141 |

(Continued)

FOREIGN PATENT DOCUMENTS

| | | |
|---|---|---|
| CH | 484959 A | 1/1970 |
| DE | 3125396 A1 | 1/1983 |
| DE | 19723467 A1 | 12/1998 |

(Continued)

OTHER PUBLICATIONS

Apr. 13, 2015 International Search Report issued in International Patent Application No. PCT/EP2015/052697.
Aug. 16, 2016 International Preliminary Report on Patentability issued in International Patent Application No. PCT/EP2015/052697.
"Compounding: plastics technology;" 2000; pp. 1-2; Retrieved from the Internet:URL:http://www.ptonline.com/articles/compounding(1).
Dipl.-Ing. Sabine Schönfeld; "Compounding with the Co-rotating Twin Screw Extruder ZSK;" Apr. 2013; URL:http://www.ktron.com/News/Seminars/Bulk_Solids_Handling/BSH-Downloads/Presentations/Coperion Applications EN .cfm.

(Continued)

*Primary Examiner* — Erma C Cameron
(74) *Attorney, Agent, or Firm* — Oliff PLC

(57) ABSTRACT

The present invention relates to the extrusion of polymer compositions based on polyvinylchloride (PVC) as a semifinished PVC product, in particular as pellets, and in particular to a method in which homogeneous polymer compositions with an elongation at break of 0 to 270%, a tensile strength of at least 1 N/mm2 and a degree of gelation of 5 to 80% are produced by using a specific energy input SEI of 0.03 to 0.09 kWh/kg. The method according to the invention is expediently conducted by a plasticizer being added in a number of portions to the non-compounded polyvinylchloride and mixed in with it. The method according to the invention thereby offers a quick and easy possible way of producing semifinished plasticized PVC products, in particular as pellets, the production of which only requires a single processing device in the form of an extruder.

16 Claims, No Drawings

(56) References Cited

U.S. PATENT DOCUMENTS

2008/0269377 A1* 10/2008 Matuana ............... B82Y 30/00
524/13

FOREIGN PATENT DOCUMENTS

| EP | 0426619 A2 | | 5/1991 |
|----|------------|---|--------|
| EP | 0611250 A1 | | 8/1994 |
| GB | 1134167 | * | 11/1968 |
| WO | 00/10794 A1 | | 3/2000 |

OTHER PUBLICATIONS

Potente et al.; "Determination of the Degree of Gelation of PVC with DSC;" Kunststoffe German Plastics; 1987; 77 (4); pp. 401-404.
Mar. 8, 2018 Office Action issued in Chinese Patent Application No. 201580008312.X.
Aug. 10, 2017 Search Report issued in European Patent Application No. 15705939.5.
Sep. 20, 2018 Office Action issued in Chinese Patent Application No. 201580008312.X.

* cited by examiner

METHOD FOR PRODUCING SEMIFINISHED PLASTICIZED PVC PRODUCTS

TECHNICAL FIELD

The invention relates to the production of polymer compositions based on polyvinyl chloride (PVC) as semifinished PVC product, in particular in the form of granules.

PRIOR ART

The high stability of PVC with respect to combustion and also its low price and advantageous processing qualities are among the main reasons why this material is nowadays one of the most widely used varieties of plastic. According to the prior art, PVC must be compounded with stabilizers before it can be used for the production of end products or intermediates as for example by shaping methods using extrusion. The term "compounding" refers to a separate processing step in which raw PVC (i.e. the product obtainable directly from the polymerization of vinyl chloride) is mixed, while being heated, with stabilizing additives and optionally with plasticizers, fillers, and further additives, in order to form a substantially homogeneous material. This material is sold as an intermediate product, in the form of pellets or granules, for example, to the end processor.

The compounding of PVC requires considerable quantities of energy and is therefore a significant cost factor in the processing of PVC. To date, however, only a few methods have been described in which compounding can be circumvented. It was long assumed that compounding was an absolute necessity in PVC production, the expectation being that uncompounded PVC would undergo considerable decomposition in the course of its extrusion.

Depending on application, PVC today is divided into flexible PVC and rigid PVC. Rigid PVC is used to produce components such as pipes and profiles, for windows, for example, while flexible PVC, which includes a significant fraction of plasticizer, is frequently used for sheathing of cables. Other frequent applications of flexible PVC are found in floor coverings, hoses, footwear soles, roof seals, or else rubber gloves. Flexible PVC, as mentioned, includes a significant fraction of plasticizers, which endows the inherently hard PVC material with plastic qualities, such as a desirable conformity, in particular. In the course of thermoplastic working, the plasticizers become lodged between the molecular chains of the PVC, thereby loosening its structure.

One factor important for flexible PVC is the gelation of the PVC material. It has decisive consequences for the mechanical properties of the material, and also for its weldability. Gelation begins typically at temperatures above 130° C. in the presence of PVC and plasticizers, and is usually concluded at temperatures around 190° C., where a degree of gelation of 100% is reached. For example, the tensile strength and elongation at break go up with increasing degree of gelation. For PVC products which can be used industrially, a degree of gelation in the range from 10% to 50% is unfavorable, since it leads to relatively poor mechanical properties, which are unsuitable for the majority of applications. A degree of gelation in the range of 60% or more, in contrast, affords mechanical properties which are considered as useable. On the other hand, the degree of gelation must not be too high. Accordingly, while the mechanical properties do continue to improve at degrees of gelation of more than 95%, the high degree of gelation leads to problems with the weldability of the material. Hence PVC with a degree of gelation of more than 100% is no longer weldable, meaning that it can only be subsequently worked at temperatures which lead to thermal damage and to breakdown of the material. In the case of semifinished PVC products a relatively low degree of gelation is generally set since the higher gelation required for the end product is set during the production of the end product.

Gelation is dependent on the processing temperature and the time for which the material is exposed to this temperature. The key factor here is the temperature. It is also noteworthy that gelation is not reversible. The degree of gelation of PVC is therefore determined substantially by the maximum temperature during the processing of the material. Standard flexible PVC materials are processed commonly at a temperature between 170 and 190°, resulting in a degree of gelation in the range from 70% to 100% and in a good balance between mechanical properties and weldability.

Flexible semifinished PVC products are produced nowadays generally via intermediates, as for example by a "dry blend" (i.e., a special mixture of PVC powder).

Production of PVC "Dry Blends":

In this process, PVC, additives, processing aids, fillers, and plasticizers are heated in a high-speed mixer to temperatures of about 100 to 120° C. This process yields a homogeneous, dry powder with greater or lesser flowability. The end product at this stage is not gelled (degree of gelation about 0%) and is used as an intermediate for the following methods A and B. Dry blends of PVC can be produced using batchwise or else continuous processes, as are described in CH 484 959, for example. CH 484 959 uses a mixing mill to mix the individual components into a dry blend. The outlet of said mill is connected directly to the inlet for an extruder, in which the dry blend is processed further.

A) Production of Partially Gelled Pellets

For this purpose, the "dry blend" product is introduced into an extruder, heated to form a homogeneous melt, and then shaped into granules or pellets of uniform size. In the course of heating, the temperature is generally between 140 and 160° C., and so a degree of gelation below 100% is attained. The pellets thus produced correspond to a semifinished product.

For the processing to the end product the produced pellets are subsequently introduced into an extruder, heated and extruded into a desired shape.

B) Processing of the Dry Blend

The dry blend material can also be further processed directly to the end product in that it is supplied to an extruder, heated with melting at 170 to 190° C., and pressed through a die for producing a flat web or through a profiled die to form a profile. A disadvantage of this procedure, however, is that the dry blend is in the form of a powder having a degree of gelation of 0%, leading to disadvantages in later processing. For instance, during storage and transport, a powder may undergo caking. Moreover, a powder has to be devolatilized for further processing, and this results in higher production costs. These disadvantages can be avoided by the processing of granules.

A feature common to the processes described above is that the in some cases multiple heating and cooling necessitate a relatively high energy input in order to set the desired properties, especially in relation to elongation at break and tensile strength. For instance, for the production of the dry blend alone, an energy input is required, measured on the basis of the SEI (Specific Energy Input), of between 0.05 and 0.10 kW*h/kg. The further processing of the dry blend produced to semifinished products requires a further energy input in the region of 0.06 to 0.15 kW*h/kg, and so, in the overall balance, an energy input in the region of at least 0.11 kW*h/kg is required.

The objective and problem addressed by the present invention, accordingly, is that of overcoming the disadvantages of the prior art and of providing a method which while minimizing the energy expenditure affords a flexible semifinished PVC product that can be provided in the form of granules. The intention is to provide extremely homogeneous granules, permitting a homogeneous conveying volume of the extruder for the production of the finished product. The intention, furthermore, is that the flexible semifinished PVC product can be produced easily and quickly, with as far as possible only a single processing step being required. Lastly, the energy input needed for this method is to be extremely low, in order to improve profitability relative to the processes presently available.

In accordance with the invention it has been found that this objective is achieved with a method for extruding a homogeneous polymer composition, which has a degree of gelation of 5% to 80%, an elongation at break of 0 to 270%, and a tensile strength of at least 1 N/mm$^2$, from an uncompounded polyvinyl chloride, which is characterized in that the method has a specific energy input (SEI) of 0.03 to 0.09 kWh/kg, more particularly 0.05 to 0.08 kWh/kg. With particular preference the method has a specific energy input (SEI) of 0.06 to 0.07 kWh/kg (depending on the viscosity of the formulation).

The extruded homogeneous polymer composition has a degree of gelation of 5% to 80%, preferably 30% to 60%, and more preferably of 40% to 50%. The elongation at break of the extruded homogeneous polymer composition may be 0% to 270%, preferably 20% to 250%, especially preferably 50% to 200%, and particularly preferably 100% to 150%. Furthermore, the tensile strength of the extruded homogeneous polymer composition is at least 1 N/mm$^2$, preferably at least 2 N/mm$^2$, more preferably 2.5 to 13 N/mm$^2$, especially preferably 5 to 10 N/mm$^2$, most preferably 6 to 9 N/mm$^2$.

Through the method of the invention it is possible for the homogeneous polymer composition to be obtained in one method step, from noncompounded polyvinyl chloride, into granules having a certain degree of gelation. As a result, more homogeneous granules with more uniform bulk densities are obtained. The advantage of these degrees of gelation lies in advantageous processing behavior in the extruder. This is manifested not in the mechanical properties of the completed product extruded from the extruder, but in a more uniform thickness of the membranes or profiles produced from said product.

A further advantage of this method over the prior art, moreover, lies in a higher throughput of the extruder, thereby lowering the production costs. Moreover, the plasticizer can be added at or with higher temperatures, so improving the incorporation of the plasticizer into PVC and raising the throughput. If the temperature is increased, there is an exponential rise in the incorporation of the plasticizer, if the temperature is at or above the Tg of the plasticizer.

The extruded homogeneous polymer composition obtained from the method of the invention is preferably in the form of granules. Granules here include granulated forms such as pellets or beads. The extruded homogeneous polymer composition obtained from the method of the invention constitutes a semifinished PVC product. The semifinished product obtained can be used for producing various PVC products, such as flat webs, sheets, profiles, etc.

"Uncompounded polyvinyl chloride" for the purposes of the present invention refers to raw PVC (i.e.), the product obtainable directly from the polymerization of vinyl chloride). This PVC may admittedly have been physically mixed with a stabilizing additive, for example, but unlike compounded polyvinyl chloride it is not treated thermally in order to allow the incorporation, for example, of stabilizing additive or plasticizer.

"Homogeneous polymer compositions" in the context of the invention encompass compositions in which the individual constituents are distributed substantially homogeneously. To the person skilled in the art it is immediately clear that within polymer compositions there may be regions formed which have a slightly higher fraction of a constituent than other regions, and that 100% homogeneous distribution of all the constituents is not generally achievable. Such compositions with "imperfect" distribution, however, are also intended to be embraced by the term "homogeneous polymer composition" in accordance with the present invention.

The tensile strength and elongation at break are determined, in the context of the present invention, in accordance with DIN EN 12311-2; method B. The degree of gelation in the context of the present invention is determined with the aid of a DSC 821e (Mettler-Toledo) by the method of Potente H. *Determination of the Degree of Gelation of PVC with DSC*, Kunststoff-German Plastics, 1987, 77 (4), pp. 401-404. For this purpose, for each measurement, 10 mg of material were heated from 25 to 220° C. at a heating rate of 20° C./min. The fraction of the melting endotherm occurring at lower temperatures relative to the sum of both melting endotherms is then expressed as the "degree of gelation" in percent. Regarding this method of determination it should be noted that it can be used to determine only degrees of gelation of up to 100%. Overgelling (degree of gelation >100%) is a term used in cases where the PVC has been heated above about 185° C. (for example at 195° C. for more than 1 min). At these temperatures, while there is a further increase in the tear strength of the material, there is nevertheless a decrease in the ultimate elongation. Overgelling is manifested, moreover, in the material no longer being weldable.

The method of the invention can be realized by way of example by adding the plasticizer to the PVC in two portions, which are added with a time offset from one another, and by adding solid constituents, optionally except for PVC-stabilizing additives, such as fillers, dyes or color pigments, only to the PVC at a point in time at which the major fraction of the plasticizer has been added to and taken up by the PVC.

An important feature of this embodiment of the present invention, accordingly, is that solid constituents are mixed into the polyvinyl chloride only at a point in time at which at least a major part of the plasticizer has been mixed with and absorbed by the polyvinyl chloride. Surprisingly it has been found that this regime results in a substantial improvement in the mechanical properties, such as the tensile strength and elongation at break in particular, and in an improvement in the residual thermal stability.

The semifinished PVC products produced with the method of the invention preferably have a residual thermal stability of at least 90 minutes, more particularly of at least 100 minutes, and very preferably of at least 105 minutes. The residual thermal stability is understood to be the time span within which the flexible PVC compound still does not show decomposition with elimination of HCl at a temperature of 180° C. The residual thermal stability is therefore a measure of the stability of the material under thermal load, and was determined on the basis of DIN 53 381-1.

In one preferred embodiment the method of the invention relates to the production of a polymer composition which consists substantially of (A) 30 to 80 wt % of polyvinyl chloride,
(B) 0.5-5 wt % of a stabilizing additive,
(C) 0-40 wt % of a solid constituent, and
(D) 5-40 wt % of a plasticizer, liquid at room temperature, for the polyvinyl chloride, where the figures in wt % are based in each case on the total weight of the polymer composition, and where the method comprises the steps of (I) feeding polyvinyl chloride (A) in uncompounded form into an extrusion apparatus having at least one rotor, which has at least three kneading and/or mixing zones and is capable of both transporting and mixing the mixture, (II) feeding the polyvinyl chloride (A) and stabilizing additive (B) into the extrusion apparatus through a first inlet, which is disposed in the vicinity of the drive unit and adjacent to a first conveying segment section of the at least one rotor;

(III) feeding the plasticizer to the polyvinyl chloride mixed with the stabilizing additive through at least two inlets at a distance from one another, the plasticizer being added in at least two portions each of about 20-80 wt %, based on the total weight of the plasticizer, to the polyvinyl chloride, there being a kneading and/or mixing zone disposed between the addition of the individual portions, (IV) working the plasticizer/polyvinyl chloride mixture at a temperature of or above the glass transition temperature of the polyvinyl chloride, the temperature of the mixture not exceeding 150° C., until the plasticizer has been incorporated substantially completely into the polyvinyl chloride, (V) optionally feeding the solid constituent (D) to the polyvinyl chloride mixed with the plasticizer in a section at which at least 80 wt % of the total amount of the plasticizer has been incorporated into the polyvinyl chloride, (VI) optionally devolatilizing and extruding the mixture through the extrusion die.

Constituents A and B can be supplied in unmixed form to the extruder in step (II). For reasons of expediency, however, components A and B may also be mixed with one another before being added to the extruder, without supply of heat, this having only a marginal influence on the overall energy balance of the method. In this case component (B) is preferably a material solid at 25° C. In the case of a stabilizer which was liquid at 25° C., a coating with the additive would be formed on the PVC particles on mixing with the PVC, and this coating would render the particles sticky. This can lead to problems in the further processing of the material.

An alternative, albeit less preferable, possibility is for the stabilizing additive to be added at a later point in time, as for example together with the plasticizer in step (III), to the PVC. In that case the stabilizing additive is preferably liquid.

The glass transition temperature (Tg) mentioned in step (IV), and also all glass transition temperatures, are to be determined for the purposes of the present invention with the aid of DSC (Differential Scanning Calorimetry).

With regard to the production of semifinished products in accordance with the present invention it should also be noted that the plasticizer-containing product (i.e., the product obtained from step IV) ought not to undergo any further substantial heating before it is extruded to granules or pellets, so as to prevent an excessive increase in the degree of gelation. Accordingly the product ought not to be heated to temperatures of more than 190° C., preferably 180° C., in order to ensure the establishment of a degree of gelation of 5% to 80%.

In one embodiment, the statement "substantially completely" in step (IV) is to be interpreted to mean that no phase separation between plasticizer and polyvinyl chloride is observed and that the mixture present is homogeneous.

In a further preferred embodiment, the method of the invention relates to the production of a polymer composition which consists substantially of (A) 30 to 80 wt % of polyvinyl chloride,
(B) 0.5-5 wt % of a stabilizing additive,
(C) 0-40 wt % of a solid constituent, and
(D) 5-40 wt % of a plasticizer, liquid at room temperature, for the polyvinyl chloride, where the figures in wt % are based in each case on the total weight of the polymer composition, which is fed in uncompounded form into the polyvinyl chloride (A) with an extrusion apparatus having at least one rotor, which has at least three kneading and/or mixing zones and which is capable of both transporting and mixing the mixture, and where the method comprises the steps of (I) feeding the polyvinyl chloride (A) and stabilizing additive (B) into the extrusion apparatus through a first inlet, which is disposed in the vicinity of the drive unit and adjacent to a first conveying segment section of the at least one rotor;

(II) feeding the plasticizer to the polyvinyl chloride mixed with the stabilizing additive through at least two inlets at a distance from one another, the plasticizer being added in at least two portions each of about 20-80 wt %, based on the total weight of the plasticizer, to the polyvinyl chloride, there being a kneading and/or mixing zone disposed between the addition of the individual portions, (III) working the plasticizer/polyvinyl chloride mixture at a temperature of or above the glass transition temperature of the polyvinyl chloride, the temperature of the mixture not exceeding 150° C., until the plasticizer has been incorporated substantially completely into the polyvinyl chloride, (IV) optionally feeding the solid constituent (D) to the polyvinyl chloride mixed with the plasticizer in a section at which at least 80 wt % of the total amount of the plasticizer has been incorporated into the polyvinyl chloride, (V) optionally devolatilizing and extruding the mixture through the extrusion die.

Steps (I), (II) and (III) are subject, analogously, to the statements made above for steps (II), (III) and (IV).

As starting material (A) for the polymer composition it is possible to use any customary, uncompounded polyvinyl chloride suitable for the production of compounded PVC. Uncompounded PVC is a commercial particulate product and may be acquired from various producers. The expression "particulate" refers to any solid form of PVC, including pulverulent, compacted, particle-like, and pelletized forms, such as pellets or beads, for example. The upper and lower limits of 30 and 80 wt % are considered critical in that at less than about 30 wt % of polymeric PVC, the quality of the end product would be unacceptable, whereas a fraction of more than 80 wt % would result in a plasticizer fraction inadequate for the production of flexible PVC. In one preferred embodiment, the polyvinyl chloride to be included in the method is polyvinyl chloride produced by suspension polymerization (also referred to as S-PVC). Relative to polyvinyl chloride produced by suspension polymerization, with polyvinyl chloride which has been produced by emulsion polymerization (also referred to as E-PVC) it is more difficult to produce products having suitable properties.

Accordingly, the polyvinyl chloride to be included in the method is preferably not E-PVC.

As PVC-stabilizing additive (B) it is possible in the method of the invention to use commercially available, suitable, and known compositions or mixtures. A minimum of about 0.5 wt % is considered to be critical, since below this figure, commercial stabilizing additives or mixtures of such additives do not impart a sufficiently long-term stabilizing effect. At more than 5 wt % of the overall composition, on the other hand, there are no additional stabilizing advantages, whereas other product properties such as optical and mechanical qualities, for example, may suffer. Preferred stabilizing additives are inorganic heavy metal salts, metal soaps, especially those of barium, lead, zinc or calcium, and also dibutyl tin and dioctyl tin compounds, and epoxidized soya bean oil. Particularly preferred are calcium/zinc stabilizers or barium/zinc stabilizers, which are immediately familiar to the person skilled in the art. The stabilizing additive may be liquid or solid at 25° C., with solid being preferred.

Besides PVC and a stabilizing additive, the polymer compositions for processing in accordance with the invention comprise preferably 0 to 40 wt %, more preferably 0.01 to 35 wt %, and most preferably about 0.3 to 30 wt % of a solid constituent (C). A solid constituent for the purposes of the invention is characterized in that it does not dissolve in the PVC but instead forms a particulate constituent. Solid constituents of this kind include, in particular, fillers, dyes, and color pigments. The solid constituent preferably encompasses fillers, more particularly mineral fillers, and optionally color pigments. Fillers particularly suitable in connection with the present invention are kaolin and calcium carbonate. Particularly preferred color pigments are carbon black and titanium dioxide.

A further important constituent of the polymer compositions which can be produced in accordance with the method outlined here is a liquid plasticizer (D). The amount of the liquid plasticizer in the polymer composition is expediently about 5 to 40 wt %, more particularly about 15 to 40 wt %, and more preferably about 20 to 40 wt %. As is familiar to the person skilled in the art, the amount of the plasticizer incorporated into the polyvinyl chloride is dependent on the intended applications properties. Hence a relatively small fraction of plasticizer is sufficient for the production of a relatively solid PVC, while for the production of flexible polyvinyl chlorides, more particularly those which are subsequently weldable, a higher fraction of plasticizer is required.

Plasticizer suitable in connection with polyvinyl chloride are, in particular, liquid plasticizers such as high-boiling esters of an acid, preferably of terephthalic acid or adipic acid, and of one or more alcohols, such as butanol or alkanols having 8 to 12 carbon atoms. Particularly suitable plasticizers in the context of the present invention are dioctyl phthalate (DOP), diisononyl phthalate (DINP), diisodecyl phthalate (DIDP), and dioctyl adipate (DOA).

As already noted above, the PVC composition consists substantially of the constituents (A) to (D). "Substantially", however, is to be taken to mean that the composition does not necessarily consist exclusively of these constituents, but may additionally include small fractions of additional constituents, such as customary additions to PVC, particularly those in the form of flame retardants, lubricants, UV absorbers, blowing agents, adhesion promoters, antistats, fungicides or impact modifiers. It is also possible to admix a small amount of a second polymer constituent, such as a PVC-compatible (e.g., halogenated) polyethylene-based or acrylic acid-based polymer. In such a case, this constituent is fed into the cavity together with the particulate PVC, again without significant preliminary mixing. It is preferred, however, if these constituents together account for not more than about 10 wt %, more particularly not more than about 8 wt %, and more preferably not more than about 5 wt %, based on the total weight of the PVC composition.

One apparatus particularly suitable for the method of the invention is an extrusion apparatus which comprises a pair of substantially isomorphous, elongate rotors which fit into the cavity and are disposed adjacent to one another for interpenetrating movement. A pair denotes the number "two". An extrusion apparatus of this kind is also referred to as a twin-screw extruder. One particularly preferred extrusion apparatus is a codirectionally rotating, closely intermeshing two-screw extruder.

The rotors are "interpenetrating" in the sense that a projection on one of the rotors, at a given location of the longitudinal and rotational position, interacts with a recess in the other rotor in the corresponding position, so that in general the distance between the rotors remains substantially constant at any point between them along the length of the cavity. The use of rotors with both conveying and also kneading and/or mixing subsections is known per se and is elucidated in more detail in EP 0 426 619. Regarding the kneading and/or mixing subsections, it should be noted that within the field of extruder technology there is no sharp cutoff between such sections, since mixing always includes an element of kneading, and kneading always includes an element of mixing. For this reason, the expressions "kneading" and "mixing" are used synonymously in the present specification.

The at least one rotor, preferably two or more rotors, used in the method of the invention form preferably (i) a first conveying segment section adjacent to the rotor end/ends connected to the drive of the extrusion apparatus; (ii) a first mixing section downstream of and adjacent to the first conveying segment section; (iii) a second conveying segment section downstream of and adjacent to the first mixing segment section; (iv) a second mixing segment section downstream of and adjacent to the second conveying segment section; (v) a third conveying section downstream of and adjacent to the second mixing segment section. Furthermore, the rotors preferably have (vi) a third mixing segment section downstream of and adjacent to the third conveying segment section, and (vii) a fourth conveying segment section downstream of and adjacent to the third mixing segment section.

The term "downstream" used here relates to a place along the length of the rotor that is nearer to the extrusion end of the extrusion apparatus than the reference place mentioned in connection with the expression "downstream". The fourth conveying segment section is generally disposed adjacent to the extrusion end of the extrusion apparatus, in other words to the end which is equipped with an extrusion die of a customary construction dependent on the form of the product to be produced. In order to generate the necessary pressure, especially in the case of relatively large units, it may be advisable to install a melt pump between the extruder and the extrusion die in order to prevent overheating of the polymer.

For a twin-screw extruder it is preferred if each of the rotors has a length L in the range from 32 to 60 times, preferably from 36 to 52 times, its diameter D. For a method using a twin-screw extruder it is further preferred if a first portion of plasticizer is added at an L/D ratio in the range from 1 to 8 and a second portion of plasticizer is added at an L/D ratio of about 10 to 20. The L/D ratio here is a measure of the position, based on the total length of the rotor, at which the addition is to take place.

The method of the invention is not confined to the use of twin-screw extruders. The method may equally well be carried out with other extrusion apparatus, such as a planetary roller extruder, an annular extruder, a multiscrew extruder or a Buss kneader, for example. If using these extrusion apparatuses, the geometry of the addition especially of the plasticizer should be adapted accordingly.

For the method of the invention in accordance with the first alternative described it is expedient, as already elucidated above, for a maximum fraction of the plasticizer to be incorporated into the polyvinyl chloride before a solid constituent, such as a filler, for example, is added to the mixture. Hence it is particularly preferred if the solid constituent, preferably all of the solid constituents, is or are added to the polyvinyl chloride, which has been mixed with the plasticizer, only at a point in time at which at least 90 wt %, preferably at least 95 wt %, and more particularly at least 99 wt % of the plasticizer has been kneaded into the polyvinyl chloride. It is preferred, furthermore, if the polyvinyl chloride in step (V) is admixed with at least 80 wt %, preferably at least 95 wt %, and more preferably at least 99 wt % of the total amount of the solid constituents, i.e., of the optionally mineral fillers, pigments, and dyes that are to be incorporated into the composition. It is most preferred if all of the solid constituents are not mixed with the PVC until the plasticizer has been incorporated fully into the polyvinyl chloride. Similar comments apply in respect of step (IV) in accordance with the second alternative described.

For the method of the invention it is further preferred if the temperature of the plasticizer for mixing with the polyvinyl chloride is adjusted to at least 30° C. below the glass transition temperature (Tg) of the polyvinyl chloride, preferably at least 15° C. below the Tg of the polyvinyl chloride and more preferably to the Tg or above the Tg of the polyvinyl chloride. The Tg of polyvinyl chloride may be taken expediently as a value of 80° C., corresponding to the glass transition temperature of pure polyvinyl chloride. The reason for this is that in the region at and/or above the glass transition temperature of the polyvinyl chloride, this polyvinyl chloride takes up the plasticizer particularly well, and that in the region of its transition temperature the polyvinyl chloride has softened sufficiently to allow it to be mixed effectively with the plasticizer. The means by which this temperature is achieved, however, are not critical to the invention. Hence the temperature may be accomplished, for example, by heating of the plasticizer before feeding it in, by means of heat exchangers. It is also possible for the PVC to be preheated using bulk-material heat exchangers.

In connection with the present invention it has emerged as being expedient if the amount of energy introduced by the extrusion apparatus is provided both in the form of mechanical energy (by the screw) and in the form of thermal energy, preferably by means of heating elements. In this case the PVC can be metered at room temperature, while the plasticizer is preferably preheated to a temperature above, but not mandatorily, the glass transition temperature.

If the extrusion apparatus has heating elements it is preferred if they are set to a temperature of at least 100° C., preferably at least 120° C. On the other hand, the temperature of the heating elements ought not to be too high, so that the gelation of the product does not exceed a level of 80%. The temperature of the heating elements therefore is preferably not more than 160° C., more particularly not more than 150° C.

It is also preferred in the context of the present invention if the temperature for the mixing of polyvinyl chloride and the plasticizer is not so far above the glass transition temperature of the polyvinyl chloride, so that there is no premature gelation of the polyvinyl chloride. Hence it is preferred if the temperature on mixing of the plasticizer with the polyvinyl chloride, particularly for the incorporation of the first portion of the plasticizer, is preferably not more than 50° C. above the glass transition temperature of the polyvinyl chloride, preferably not more than 40° C. above the glass transition temperature of the polyvinyl chloride, and more preferably not more than 35° C. above the Tg of the polyvinyl chloride. Metering in plasticizer at temperatures below the Tg of the PVC is likewise possible.

As already elucidated above, for the method according to the present invention it is very advantageous if the plasticizer is added in at least two portions to the polyvinyl chloride. The reason for this is that it has been observed that on addition of excessive amounts of plasticizers, reasonable mixing of the plasticizer and of polyvinyl chloride is not possible, since the plasticizer cannot be taken up quickly enough by the polyvinyl chloride. In connection with step (III), in which the incorporation of the plasticizer into the polyvinyl chloride is described, accordingly, it is preferred if the individual portions of plasticizer to be fed in to the polyvinyl chloride, which has been mixed with the stabilizing additive, account for about 30 to 70 wt %, preferably about 40 to 60 wt %, based on the total weight of the plasticizer. In connection with the present invention it has proven particularly favorable if the portion of plasticizer added first accounts for about 55±3 wt %, and the portion of plasticizer added subsequently accounts for about 45±3 wt % of the amount of plasticizer.

For the mixing and/or kneading zone which the PVC composition passes through after the first addition of the plasticizer it is expedient, moreover, if this zone is designed such that the plasticizer can be mixed with the polyvinyl chloride in such a way that a homogeneous mixture is formed before a second portion of plasticizer is added.

In relation to the solid constituent, more particularly the filler, it has already been indicated above that it is sensible for a maximum fraction of the solid constituent, more particularly the filler, to be added to the polyvinyl chloride only when the plasticizer has been incorporated substantially completely into the polyvinyl chloride. In this context it is most preferred if the solid constituent, more particularly the filler, is incorporated into the polyvinyl chloride only after the plasticizer has been incorporated substantially completely, i.e., to an extent of at least 90 wt %, preferably at least 95 wt %, and most preferably at least 99 wt %, into the polyvinyl chloride. The weight figures above are based on the weight of the plasticizer phase and of the separate phase of the optionally plasticizer-containing PVC.

In order to generate gelation, or a degree of gelation in the range from 5 to 80%, preferably 30 to 60% and more preferably 40 to 55%, it is expedient, at the end of the method outlined above, for the polyvinyl chloride, before being extruded through the extrusion die, to be heated to a product temperature of at least about 130° C. to at most about 170° C., preferably about 135 to 155° C., and more preferably about 140 to about 150'C. In this temperature range the desired degree of gelation comes about in dependence on the time for which the PVC composition is exposed to this temperature. In relation to these temperatures it is preferred, however, if the composition is not exposed to these temperatures until the plasticizer has been incorporated substantially completely, i.e., to an extent of at least 95 wt %, based on the total amount of the plasticizer, into the polyvinyl chloride. The person skilled in the art is able to infer from the above that the degree of gelation is dependent on the product of temperature and of time, and is readily able to harmonize the temperature regime in the extrusion apparatus to the intended degree of gelation.

In one particularly preferred embodiment, the method of the invention is carried out on a corotating twin-screw extruder having a length L of about 44 times its diameter D, the design of the method being as follows:

(i) Feeding of S-PVC and the stabilizing additive into a mixing zone at an L/D ratio of 0 to 4.

(ii) Metered addition of liquid plasticizer, having a temperature of between 20 and 120'C, preferably 60 to 110° C., at an L/D ratio of 4 to 8.

(iii) Mixing and kneading of the PVC with the plasticizer at an L/D ratio of 6 to 16.

(iv) Metered addition of liquid plasticizer at a plasticizer temperature of between and 160° C., preferably 60 to 140° C., at an L/D ratio of 14 to 20.

(v) Mixing and kneading of the PVC with the plasticizer at an L/D ratio of 16 to 24.

(vi) Addition of solid constituents, more particularly fillers and pigments, preferably via a side feed, at an L/D ratio of 20 to 28.

(vii) Dispersing of the solid constituents and further heating of the PVC/plasticizer mixture at an L/D ratio of 24 to 34.

(viii) Devolatilization of the mixture under reduced pressure to form a bubble-free product at an L/D ratio of 32 to 36.

(ix) Development of pressure for extrusion of the processed composition at an L/D ratio of 36 to 44.

For relatively large processing machines, the use of a melt pump is particularly advantageous.

One preferred application of the method of the invention is the continuous production of granules or pellets.

The production of granules can take place, for example, by hot die face granulation or by cold granulation.

The present invention is elucidated in more detail below by a number of examples, which, however, are not intended in any way to have a limiting effect on the scope of protection of the specification.

EXAMPLES

Comparative Example: Dry Blend and Extruder Method According to the Prior Art

PVC can in general not be processed without plasticizers, without thermal degradation of the PVC and hence the formation of hydrochloric acid occurring. In a first step according to the method for producing dry blends in accordance with the prior art, PVC, plasticizers, additives, and fillers are introduced into a simple mixing apparatus which is operated at a high speed and which is capable of heating the mixture by means of friction. The composition for this purpose consists of 56% of a premix of S-PVC and stabilizing additives, 35% of plasticizers, and 9% of fillers and pigments. With the aid of the mixing apparatus, the mixture is heated to 110 to 120° C. and treated in the mixer until a dry, free-flowing powder has formed. Within this step the plasticizer migrates into the PVC grain. It is important that here the migration of plasticizer has fully concluded. Incomplete migration prevents the attainment of good mechanical values on processing. The specific energy input (SEI) required for this step is between 0.05 and 0.10 kWh/kg for the dry blends described.

Following this treatment, the dry blend obtained is transferred to a cooling apparatus and cooled to a temperature of less than 40° C.

The dry blend thus obtained is then passed to an extrusion apparatus where it is heated by friction or convection until a homogeneous and processable melt is obtained. This is normally the case at temperatures of 160 to 195° C. The melt is then devolatilized and extruded in order to produce granules. Employed for this purpose were common extrusion apparatuses, such as a single-screw extruder, a contrarotating twin-screw extruder, a corotating twin-screw extruder, a Buss kneader and a planetary roller extruder. For the production of granules from the dry blend an SEI of about 0.06 to 0.15 kWh/kg is required depending on the extrusion apparatus used. Overall, therefore, for the production of granules in accordance with the prior art, SEI values of 0.11 to 0.25 kWh/kg are needed (SEI for dry blend+SEI for granule production). It follows from this that in accordance with the prior art, as a result of the intermediate stage of producing a dry blend, a total energy input (SEI) of at least 0.11 kWh/kg is required in order for granules to be produced.

Inventive Examples 1 to 4

In the inventive examples, the constituents were supplied continuously and throughout the implementation of the experiment in accordance with their corresponding proportions in order to produce a granule. In order to simplify the experiments, however, the PVC and also the stabilizing additives were premixed cold. The separate addition of the additives is readily possible by adapting the extrusion apparatus.

Example 1

The feed section was cooled with water in order to prevent clogging. All barrel temperatures were set to a temperature of 120° C. The screw speed was set at 180 revolutions per minute. The throughput was 15 kg/h. The extruder used was a ZE25A UT corotating twin-screw extruder from Berstorff with an L/D ratio of 44.

100% of the PVC mixed with the stabilizing additive was supplied in the feed section of the extruder. 58 wt % of the phthalate plasticizer was then supplied at a temperature of 80° C. at an L/D ratio of 6 "downstream" of the feed area for the PVC. The mixture was then mixed, kneaded and further heated. Then 42 wt % of the phthalate plasticizer was added at an L/D ratio of 16 downstream of the feed area. The PVC plasticizer mixture was mixed further, kneaded, and heated.

Downstream relative to the mixture of PVC and plasticizer, fillers and pigments were added at an L/D ratio of 24. The fillers and pigments were incorporated into the PVC by mixing and kneading. The completed mixture was then devolatilized by application of a vacuum of 100 mbar absolute pressure at an L/D ratio of 36 downstream of the feed section. The final sections of the extruder are designed for development of pressure for the flat extrusion die. The specimen produced in this way featured an SEI of only 0.075 kWh/kg, an elongation at break of 58%, and a tensile strength of 5.3 N/mm². The degree of gelation was 37%.

Example 2

Example 2 was carried out as for example 1, with the difference that the barrel temperature was set at 140° C. The product produced in this way had an SEI of 0.075 kWh/kg, an elongation at break of 113%, and a tensile strength of 8.5 N/mm². The degree of gelation was 58%.

Examples 3 and 4

Examples 3 and 4 were carried out as for example 1, with the differences that the screw speed of the extruder was set at 210 and 280 rpm, respectively, the throughput was set at 18 kg/h, and the fillers and pigments were added at the L/D ratio of 20. The products obtained by means of this method featured an SEI of 0.076 and 0.081 kWh/kg, respectively, an elongation at break of 132 and 328%, respectively, and a tensile strength of 9.2 and 14.5 N/mm², respectively.

The tensile strength and elongation at break are determined, in the examples, in accordance with DIN EN 12311-2; method B. The degree of gelation was with the aid of a DSC 821e (Mettler-Toledo) by the method of Potente H. *Determination of the Degree of Gelation of PVC with DSC*, Kunststoff-German Plastics, 1987, 77 (4), pp. 401-404. For this purpose, for each measurement, 10 mg of material were heated from 25 to 220° C. at a heating rate of 20° C./min. The fraction of the melting endotherm occurring at lower temperatures relative to the sum of both melting endotherms is then expressed as the "degree of gelation" in percent.

Additionally to the mechanical parameters, the residual thermal stability as well was determined for the PVC granules produced. For this purpose, DIN 53 381-1 was referenced, with the measurements being carried out at 180° C.

The compositions, parameters and results of the investigation of the examples described above are set out in table 1 below.

TABLE 1

| Example | PVC [kg] | Plast. 1 [kg/h] | Plast. 2 [kg/h] | Plast. temperature [° C.] | Fillers & pigments | Screw speed [rpm] | Energy consumption [kW] |
|---|---|---|---|---|---|---|---|
| 1 | 8.47 | 3.0 | 2.21 | 80 | 1.32 | 180 | 1.4 |
| 2 | 8.47 | 3.0 | 2.21 | 80 | 1.32 | 180 | 1.4 |
| 3 | 10.17 | 3.6 | 2.7 | 80 | 1.58 | 210 | 1.7 |
| 4 | 10.17 | 3.6 | 2.7 | 30 | 1.58 | 280 | 1.9 |

| Example | T(max) [° C.] | SEI [kWh/kg] | Mechanical properties | | | Residual thermal stability [min] |
|---|---|---|---|---|---|---|
| | | | Tensile strength [N/mm²] | Elongation at break [%] | Degree of gelation [%] | |
| 1 | 138 | 0.075 | 5.3 | 58 | 37 | 125 |
| 2 | 154 | 0.075 | 8.5 | 113 | 58 | 105 |
| 3 | 156 | 0.076 | 9.2 | 132 | 68 | 105 |
| 4 | 164 | 0.081 | 14.5 | 328 | 76 | 145 |

The invention claimed is:

1. A method for extruding a polymer composition to form an extruded homogeneous polymer comprised of (A) 30 to 80 wt % of polyvinyl chloride, (B) 0.5 to 5 wt % of a stabilizing additive, (C) 0 to 40 wt % of a solid constituent, and (D) 5 to 40 wt % of a plasticizer, liquid at room temperature, for the polyvinyl chloride, where the figures in wt % are based in each case on a total weight of the polymer composition, where the method comprises
   (I) feeding polyvinyl chloride in an uncompounded form and the stabilizing additive into an extrusion apparatus through a first inlet, wherein the extrusion apparatus has a drive unit, has at least one rotor, and has at least three kneading and/or mixing zones, wherein the first inlet is disposed in a vicinity of the drive unit and adjacent to a first conveying segment section of the at least one rotor;
   (II) feeding the plasticizer to the polyvinyl chloride mixed with the stabilizing additive through at least two inlets at a distance from one another, the plasticizer being added in at least two portions each of about 20-80 wt %, based on a total weight of the plasticizer, to the polyvinyl chloride, there being at least one of the kneading and/or mixing zones disposed between the addition of the individual portions,
   (III) working the plasticizer/polyvinyl chloride mixture at a temperature of or above the glass transition temperature of the polyvinyl chloride, the temperature of the mixture not exceeding 150° C., until the plasticizer has been incorporated substantially completely into the polyvinyl chloride,
   (IV) optionally feeding the solid constituent to the polyvinyl chloride mixed with the plasticizer in a section at which at least 80 wt % of a total amount of the plasticizer has been incorporated into the polyvinyl chloride,
   (V) optionally devolatilizing the mixture, and
   (VI) extruding the mixture through an extrusion die of the extrusion apparatus, wherein the extruded homogeneous polymer has a degree of gelation of 5% to 80%, an elongation at break of 0 to 270%, and a tensile strength of at least 1 N/mm², and
   wherein quantity of energy introduced into the polymer composition by the extrusion apparatus during the method, as indicated by the specific energy input (SEI), is 0.03 to 0.09 kWh/kg.

2. The method as claimed in claim 1, wherein the uncompounded polyvinyl chloride is polyvinyl chloride prepared by suspension polymerization.

3. The method as claimed in claim 1, wherein the extrusion apparatus comprises a pair of substantially isomorphous, elongate rotors which fit into a cavity of the extrusion apparatus and are disposed next to one another for interpenetrating movement.

4. The method as claimed in claim 3, wherein each of the rotors has a length L in a range of 32-60 times a diameter D thereof.

5. The method as claimed in claim 3, wherein the polyvinyl chloride is admixed with a first portion of plasticizer at an L/D ratio in the range from 1 to 8 and with a second portion of plasticizer at an L/D ratio of 10 to 20.

6. The method as claimed in claim 1, wherein said extrusion apparatus is a planetary roller extruder, an annular extruder, a multiscrew extruder or a Buss kneader.

7. The method as claimed in claim 1, wherein the solid constituent is added to the polyvinyl chloride, mixed with the plasticizer, in a section at which at least 95 wt % of the plasticizer has been kneaded into the polyvinyl chloride.

8. The method as claimed in claim 1, wherein the polyvinyl chloride is admixed in step (IV) with at least 80 wt % of the total amount of the solid constituent.

9. The method as claimed in claim 1, wherein the mixture of plasticizer and PVC is brought to a temperature of at least 30° C. below the glass transition temperature (Tg) of the polyvinyl chloride.

10. The method as claimed in claim 1, wherein individual portions for the feeding of the plasticizer to the polyvinyl chloride, mixed with the stabilizing additive, in step (II) account for about 30 to 70 wt % based on the total weight of the plasticizer.

11. The method as claimed in claim 10, wherein the plasticizer is added in two portions to the polyvinyl chloride, with the portion added first making up 55±3 wt % and the portion added thereafter 45±3 wt % of the total amount of the plasticizer.

12. The method as claimed in claim 1, wherein the amount of the solid constituent in the polymer composition is 0.01 to 35 wt %.

13. The method as claimed in claim 1, wherein the solid constituent is incorporated into the polyvinyl chloride only after the plasticizer has been incorporated substantially completely into the polyvinyl chloride.

14. The method as claimed in claim 1, wherein the amount of energy introduced by the extrusion apparatus may be introduced both in the form of mechanical energy and in the form of thermal energy, by means of heating elements, and that at the end of the extrusion apparatus a product temperature is reached of at least 130° C. up to at most 170° C.

15. The method as claimed in claim 1, wherein the homogeneous polymer composition has a residual thermal stability, determined according to DIN 53 381-1 at 180° C., of at least 90 minutes.

16. The method as claimed in claim 1, wherein the extruded homogeneous polymer composition is present in the form of granules.

* * * * *